(12) United States Patent
Sauve et al.

(10) Patent No.: US 7,921,365 B2
(45) Date of Patent: Apr. 5, 2011

(54) SYSTEM AND METHOD FOR BROWSING TABBED-HETEROGENEOUS WINDOWS

(75) Inventors: Aaron J. Sauve, Seattle, WA (US);
Charles Cummins, Seattle, WA (US);
Cornelis K. Van Dok, Tuebingen (DE);
Tony E. Schreiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 11/059,048

(22) Filed: Feb. 15, 2005

(65) Prior Publication Data

US 2006/0184537 A1    Aug. 17, 2006

(51) Int. Cl.
*G06F 3/00* (2006.01)
*G06F 3/048* (2006.01)
*G06F 9/46* (2006.01)

(52) U.S. Cl. ........ 715/738; 715/777; 715/779; 715/804; 718/100; 718/103

(58) Field of Classification Search .................. 715/738, 715/759, 804, 777, 779; 718/100, 103; 719/329; 712/216, 225, 226, 227, 228; 707/E17.119
See application file for complete search history.

(56) References Cited

U.S. PATENT DOCUMENTS

| | | | |
|---|---|---|---|
| 5,742,778 A * | 4/1998 | Hao et al. ................. | 715/759 |
| 5,752,031 A * | 5/1998 | Cutler et al. .............. | 718/103 |
| 5,842,206 A | 11/1998 | Sotomayor | |
| 5,949,413 A | 9/1999 | Lerissa et al. | |
| 5,987,446 A | 11/1999 | Corey et al. | |
| 6,078,914 A | 6/2000 | Redfern | |
| 6,211,877 B1 * | 4/2001 | Steele et al. ............. | 715/804 |
| 6,212,544 B1 * | 4/2001 | Borkenhagen et al. ........ | 718/103 |
| 6,247,020 B1 | 6/2001 | Minard | |
| 6,356,287 B1 | 3/2002 | Ruberry et al. | |
| 6,359,634 B1 | 3/2002 | Cragun et al. | |
| 6,370,527 B1 | 4/2002 | Singhal | |
| 6,433,801 B1 | 8/2002 | Moon et al. | |
| 6,456,303 B1 | 9/2002 | Walden et al. | |
| 6,489,975 B1 | 12/2002 | Patil et al. | |
| 6,567,839 B1 * | 5/2003 | Borkenhagen et al. ........ | 718/103 |
| 6,697,935 B1 * | 2/2004 | Borkenhagen et al. ........ | 712/228 |

(Continued)

FOREIGN PATENT DOCUMENTS

EP    1158421 A2    11/2001

(Continued)

OTHER PUBLICATIONS

Screen caps by the examiner of Microsoft Windows XP (fig.1-fig.5).*

(Continued)

*Primary Examiner* — Kieu Vu
*Assistant Examiner* — Haoshian Shih
(74) *Attorney, Agent, or Firm* — Lee & Hayes, PLLC

(57) ABSTRACT

The techniques and mechanisms described herein are directed to a method for managing multiple content windows. The content windows may host a web browser, a shell view, a word processing application, and the like. A set of content windows are grouped into a frame in a manner such that a taskbar shows one item for the set of content windows. Each content window is associated with a tab for the frame. A content-specific menu may be associated with each tab. The content-specific menu includes a set of commands based on the heterogeneous content hosted in the content window. The set of commands provide functionality to the heterogeneous content.

19 Claims, 8 Drawing Sheets

U.S. PATENT DOCUMENTS

| | | | |
|---|---|---|---|
| 6,708,162 B1 | 3/2004 | Morgan et al. | |
| 6,728,960 B1* | 4/2004 | Loomans | 718/102 |
| 6,732,090 B2 | 5/2004 | Shanahan et al. | |
| 6,792,458 B1 | 9/2004 | Muret et al. | |
| 6,801,227 B2 | 10/2004 | Bocionek et al. | |
| 6,829,599 B2 | 12/2004 | Chidlovskii | |
| 6,834,276 B1 | 12/2004 | Jensen et al. | |
| 6,834,386 B1* | 12/2004 | Douceur et al. | 718/107 |
| 6,851,072 B2* | 2/2005 | Lasserre et al. | 714/10 |
| 7,343,476 B2* | 3/2008 | Floyd et al. | 712/216 |
| 7,426,697 B2 | 9/2008 | Holecek et al. | |
| 7,478,391 B2* | 1/2009 | Doering et al. | 718/100 |
| 2001/0029527 A1 | 10/2001 | Goshen | |
| 2002/0038348 A1 | 3/2002 | Malone et al. | |
| 2002/0049756 A1 | 4/2002 | Chua et al. | |
| 2002/0069194 A1 | 6/2002 | Robbins | |
| 2002/0107718 A1 | 8/2002 | Morrill et al. | |
| 2002/0124022 A1 | 9/2002 | Yoo | |
| 2003/0071849 A1 | 4/2003 | Ferri | |
| 2003/0078956 A1* | 4/2003 | Ravichandran et al. | 709/107 |
| 2003/0110160 A1 | 6/2003 | Eich | |
| 2004/0044657 A1 | 3/2004 | Lee | |
| 2004/0061720 A1 | 4/2004 | Weber | |
| 2004/0093562 A1 | 5/2004 | Diorio et al. | |
| 2004/0117793 A1* | 6/2004 | Shaylor | 718/100 |
| 2004/0215649 A1 | 10/2004 | Whalen et al. | |
| 2004/0215791 A1* | 10/2004 | Tsao | 709/229 |
| 2005/0015726 A1 | 1/2005 | Tuominen | |
| 2005/0060287 A1 | 3/2005 | Hellman et al. | |
| 2005/0076023 A1 | 4/2005 | Wu et al. | |
| 2005/0154730 A1 | 7/2005 | Miller et al. | |
| 2006/0007875 A1 | 1/2006 | Andersen | |
| 2006/0031663 A1* | 2/2006 | Peller et al. | 712/245 |
| 2006/0085741 A1 | 4/2006 | Weiner et al. | |
| 2006/0155728 A1 | 7/2006 | Bosarge | |
| 2006/0179289 A1* | 8/2006 | Floyd et al. | 712/227 |
| 2007/0083498 A1 | 4/2007 | Byrne et al. | |
| 2007/0112759 A1 | 5/2007 | Kulakow et al. | |

FOREIGN PATENT DOCUMENTS

| | | |
|---|---|---|
| EP | 1209583 A2 | 5/2002 |
| GB | 2360921 | 10/2001 |
| KR | 20010044189 A | 6/2001 |
| KR | 20010070783 A | 7/2001 |
| WO | WO02054273 A1 | 7/2002 |
| WO | WO2004023243 A2 | 3/2004 |
| WO | WO2005020106 A1 | 3/2005 |

OTHER PUBLICATIONS

Tony Northrup, "Set up remote desktop web connection with windows XP" Jul. 2003.*

FireFox ver 1.0 screen caps pp. 1-8. 1998-2004.*

"Tabbrowser Preferences—Firefox Extension," found on Internet at https://addons.mozilla.org/extensions/moreinfo.php?id=158 &application=firefox on Jan. 25, 2006, 8 pages.

"Maxthon Tabbed Browser," found on internet at http://www.maxthon.com/ on Jan. 25, 2006, 3 pages.

"Netscape 7.1 Highlights," found on internet http://channels.netscape.com/browsers/7/learnmore/NS71_reviewersguide.pdf, 46 pages, 2003.

"Opera for Windows," found on internet at http://www.opera.com/products/desktop/ on Jan. 25, 2006, 4 pages.

OA dated Sep. 28, 2009 for U.S. Appl. No. 11/251,397.

OA dated Nov. 16, 2009 for U.S. Appl. No. 11/059,048, 13 pages.

"1Second.com; About us", printed from the Internet Oct. 14, 2005: http://www.1second.com/aboutus.htm, 2 pages.

Killerinfo.com, Inc., "About KillerInfo", printed from the Internet Oct. 14, 2005: http://search.killerinfo.com/support/us/about.html, 3 pages.

Mamma Media Solutions, "About Mamma.com", printed from the Internet Oct. 14, 2005: http://www.mamma.com/info/about.html, 3 pages.

Earth Navigator Website including Tour Guide for Earth Navigator Browser, <<http://web.archive.org/web/*/http://www.earthnavigator.com>>, 8/16/200, pp. 1-26.

"EarthNavigator Tour—Screen Snapshots", retrieved on Apr. 13, 2009 at <<http://www.earthnavigator.com/tour/tour2.htm>> and <<http://www.earthnavigator.com/tour/tour1.htm>>, pp. 1-6.

European Search Report for Application No. PCT/US2006038516, mailed on Jan. 12, 2009, 9 pages.

Office Action from the U.S. Patent and Trademark Office for U.S. Appl. No. 11/251,397, mailed on Apr. 1, 2010, 26 pages.

Mossberg, "Just Browsing?", retrieved on Feb. 4, 2009 at <<http://www.wsjclassroomedition.com/archive/04mar/ptec_browser.htm>>, The Wall Street Journal, Classroom Edition, Personal Technology, Mar. 2004, 3 pages.

"MultiWeb Viewer & Client Viewer" retrieved on Feb. 4, 2009 at <<http://web.archive.org/web/20040608201532/www.multisource.com/multiweb2.shtml>>, Published by Multisource, Archived Jun. 8, 2004, 1 page.

"MultiWeb Viewer & Client Viewer" retrieved on Feb. 4, 2009 at <<http://web.archive.org/web/20040608201818/www.multisource.com/multiweb3.shtml>>, Published by Multisource, Archived Jun. 8, 2004, 1 page.

"MultiWeb Viewer & Client Viewer", retrieved on Feb. 4, 2009 at <<http://web.archive.org/web/20040416175652/http://www.multisource.com/featuresmultiweb.shtml>>, Published by Multisource, Archived Apr. 16, 2004, 1 page.

"MultiWeb Viewer2000 Internet / Intranet Site Viewing", retrieved on Dec. 8, 2008 at <<http://web.archive.org/web/20050828200110/www.multisource.com/indexmultiweb.shtml>>, Published by Multisource, Archived Aug. 28, 2005, 1 page.

"NetCaptor 6.1.1 Final Available and NetCaptor Tour" retrieved on Apr. 13, 2009 at <<http://www.netcaptor.com>>, pp. 1-6.

"NetCaptor Tour—Browser Tab Interface", retrieved on Feb. 4, 2009 at <<http://web.archive.org/web/20021010051721/www.netcaptor.com/tour/>>, Published by Stilesoft, Inc., Archived Oct. 10, 2002, 1 page.

Pike, "Add-Ons/Better: Fast Browser; NetCaptor", retrieved on Feb. 4, 2009 at <<http://www.pcmag.com/print_article2/0,1217,a%253D31252,00.asp>>, PCMAG.COM, PC Magazine, Oct. 15, 2002, 6 pages.

"Stop Browsing the Old Way—Get NetCaptor!" retrieved on Feb. 4, 2009 at <<http://web.archive.org/web/20021121171751/http://www.netcaptor.com/>>, Published by Stilesoft, Inc., Archived Nov. 21, 2002, 2 pages.

"What is NetCaptor?", retrieved on Feb. 4, 2009 at <<http://web.archive.org/web/20021009213339/www.netcaptor.com/article/61/>>, Published by Stilesoft, Inc., Archived Oct. 9, 2002, 1 page.

ZapMeta, "ZapMeta Frequently Asked Questions", retrieved from the Internet Oct. 14, 2005: http://www.zapmeta.com/about/faq.shtml.

* cited by examiner

SYSTEM AND METHOD FOR BROWSING TABBED-HETEROGENEOUS WINDOWS

TECHNICAL FIELD

This document generally relates to browsing software, and more particularly, to tabbed-browsing software.

BACKGROUND

Browsing the World Wide Web (the web), the graphical portion of the Internet, has become quite popular in recent years. A software program, commonly referred to as a web browser, or just browser, provides an easy-to-use point-and-click interface for accessing various content on the web. Upon entering a web address or URL of a particular website, the browser requests web pages from a web server hosting that website. The browser then interprets the web pages and displays the content on a display. The web pages include hypertext and hyperlinks that, when selected, cause the browser to request additional content associated with them. By selecting the hypertext and hyperlinks, a user may conveniently navigate through pages of information—commonly known as browsing or surfing the Internet.

Each time one of the hypertext or hyperlinks is selected, the new content is downloaded into the current window. Depending on the network bandwidth, this may cause a brief to extensive delay. For convenience, additional windows may be opened to view multiple web pages. However, after opening several web pages, each in its own window, the taskbar may become quite cluttered. This makes it difficult to re-locate a particular web page. Tabbed browsers have been introduced to help manage the viewing of multiple web pages.

Tabbed browsers load web pages in "tabs" within the same browser window. Therefore, only one item appears on the taskbar, even though multiple web pages are loaded. Clicking on a hyperlink results in the web page being downloaded in the background into another tab. This allows a user to continue viewing the current web page without automatically switching to the other web page. When the web page is finished loading, the user may click on the associated tab and view that web page. Tabbed browsing makes it easier and more convenient to view multiple web pages.

The present mechanism further enhances the tabbed-browsing experience.

SUMMARY

The techniques and mechanisms described herein are directed to a method for managing tabbed-heterogeneous windows. The tabbed-heterogeneous windows may include files, folders, web pages, application-specific documents, and the like. Each tabbed-heterogeneous window includes a content-specific menu associated with the content within the tabbed-heterogeneous window. For example, if the tabbed-heterogeneous window contains a folder with pictures, the content-specific menu may include a print command, an email command, a delete command, and the like. Commands in the content-specific menu provide the full functionality to the content as if the content was not within a tabbed window.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the techniques and mechanisms described herein are directed to a method for browsing tabbed-heterogeneous windows. Instead of only having web pages in each tabbed window, the present mechanism allows tabbed-heterogeneous windows that include files, folders, web pages, application-specific documents, and the like. Each tabbed-heterogeneous window includes a content-specific menu associated with the content within the tabbed-heterogeneous window. For example, if the tabbed-heterogeneous window contains a folder with pictures, the content-specific menu may include a print command, an email command, a delete command, and the like. Commands in the content-specific menu provide the full functionality for the content as if the content was not within a tabbed window. As will be described in more detail below, the present tabbed browser provides a convenient way to manage multiple web pages as a group. In addition, the tabbed browser decreases the negative effect of opening new web pages by reducing taskbar clutter and loading the new web pages in the background without requiring the user to loose focus on the current web page. These and other benefits will be described in the following detailed description.

Exemplary Computing Environment

Figure 1:
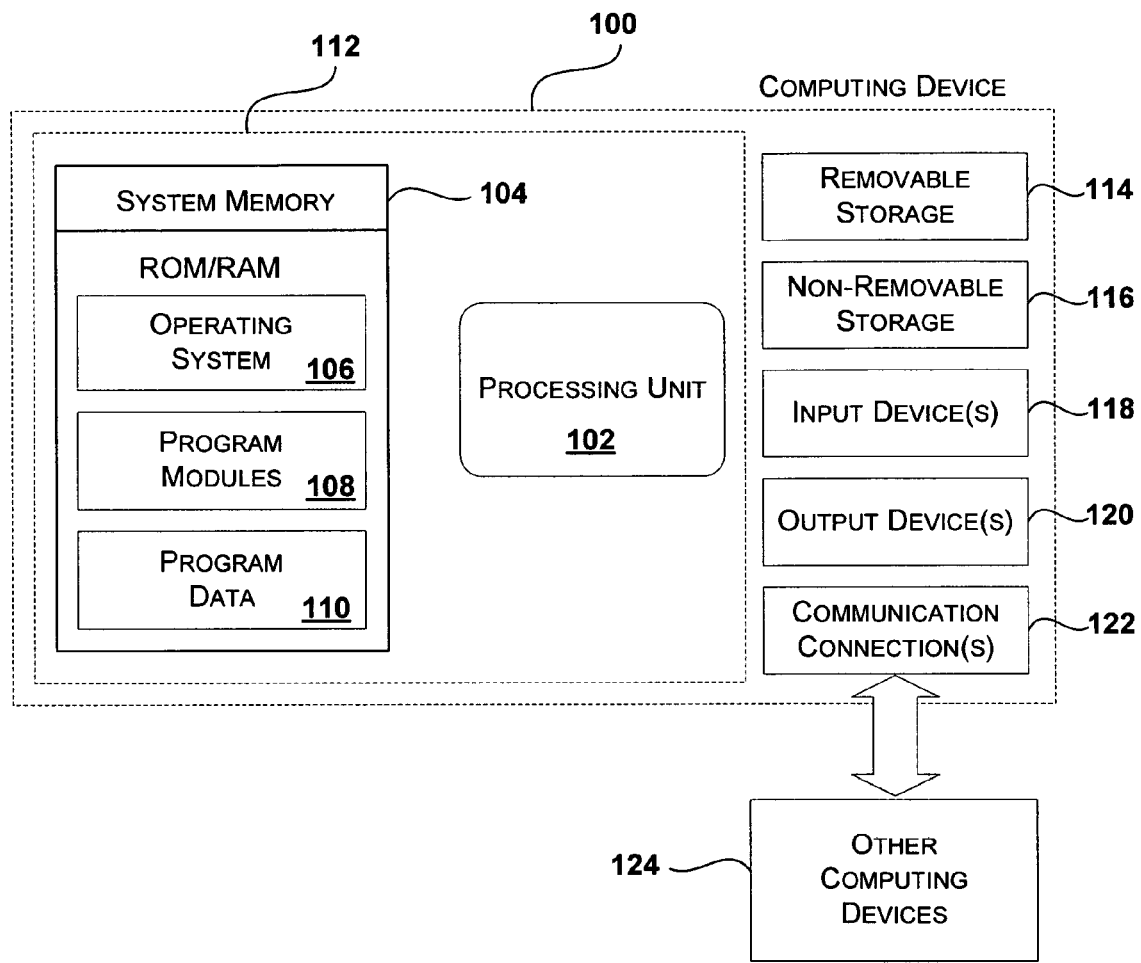
FIG. 1 is an illustrative computer environment that may be used to implement the techniques and mechanisms described herein.

The various embodiments of the mechanism for browsing tabbed-heterogeneous windows may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in FIG. 1.

With reference to FIG. 1, one exemplary system for implementing an tabbed-browsing mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), nonvolatile (such as ROM, flash memory, etc.) or some combination of the two. System memory 104 typically includes an operating system 106, one or more program modules 108, and may include program data 110. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 114 and non-removable storage 116. Computer storage media may include volatile and nonvolatile, removable and non-removable media implemented in any method or technology for storage of information, such as computer-readable instructions, data structures, program modules, or other data. System memory 104, removable storage 114 and non-removable storage 114 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard, mouse, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection(s) 122 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Architecture

Figure 2:
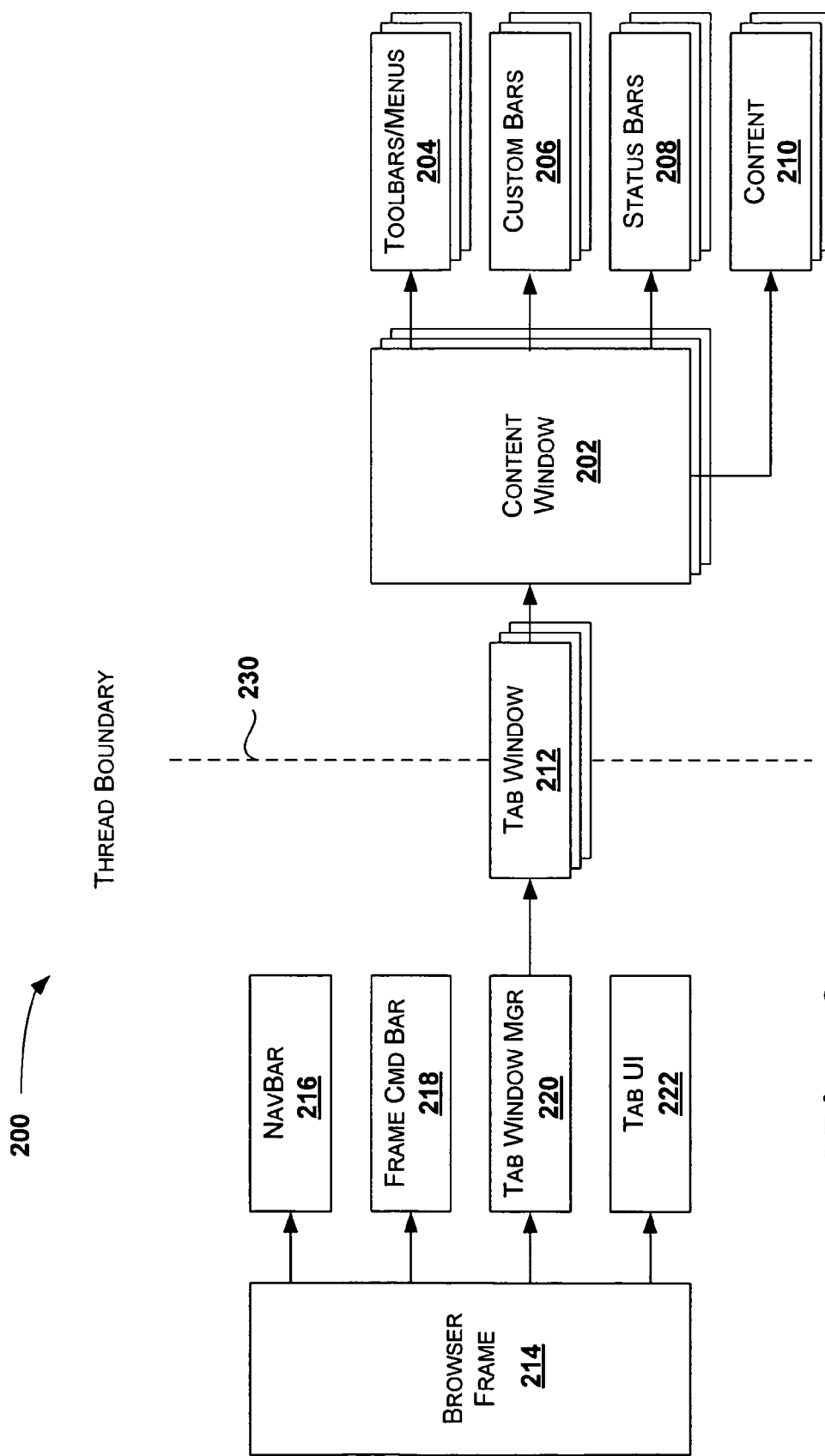
FIG. 2 is a block diagram illustrating an architecture for implementing the browsing of tabbed-heterogeneous windows as described herein.

FIG. 2 is a block diagram illustrating architecture 200 for implementing the browsing of tabbed-heterogeneous windows as described herein. Architecture 200 includes one or more content windows 202. The content window may be a web browser, a shell view, a word processing application/document, a spreadsheet application/document, a presentation application/document, a document viewer, or the like. Each content window 202 is associated with its own toolbars/menus 204, custom bars 206, status bars 208, and content 210, as needed. For example, custom bars may include bars created to operate with search engines and the like. As mentioned earlier, in traditional browsers, each browser window consumed space on a taskbar. Once a number of browser windows were opened, the taskbar became very cluttered. For the present tabbed browser, a tab window manager 220 handles all the content windows 202 via their respective tab window 212. The tab window manger 220 communicates with a browser frame 214. In addition, browser frame 214 communicates with a navigation bar 216, a frame command bar 218, and a tab user-interface 222. Each of these components will be described below in more detail after describing thread boundary 230.

Thread boundary 230 represents a boundary between a single thread (i.e., a frame thread) that handles the processing for the components shown to the left of thread boundary 230 and multiple threads that handle the processing for the components on the right of thread boundary 230. Each instance of content window 202 is associated with at least one of its own threads. That thread also handles the processing for the associated toolbars/menus 204, custom bars 206, status bars 208, and content 210.

By having multiple threads, at least one for each content window 202, the architecture prevents a potential bottleneck caused by having only one thread handle the messages for all HTML rendering across the multiple tabs. In addition, having multiple threads reduces the likelihood of unnecessary delays or timeouts when downloading web pages. Having multiple threads also makes the architecture more resilient because if a tab hangs, only one tab hangs instead of potentially hanging all of the tabs. This is in contrast with other tabbed browsers that host their tabs on a single UI thread. In these tabbed browsers, the entire application hangs when a single tab is blocked. Another advantage of the present tabbed browser is that each individual thread may be prioritized. This allows the thread for the active tab to be prioritized over background tabs.

Each of the components in architecture 200 is now described. As mentioned above, each content window 202 is associated with its own toolbars/menus 204, custom bars 206, status bars 208, and content 210, as needed. For example, if there are five tabs open, five instances of each add-on (e.g., custom bar, toolbar, etc) are created and hooked to their own content. Similarly, if menus or status bars are modified via internal logic, HTML, document hosting, add-ons, or the like, the menu or status bar associated with that content window 202 is changed. The add-ons and the content window 202 operate in a well know manner. Because the add-ons do not know about tabs, the architecture 200 does not modify the operation between the add-ons and the content window. Instead, the architecture wraps each set of content windows into one browser frame 214. While not shown, there may be multiple browser frames 214, each with a set of tabbed-heterogeneous windows.

Content window 202 maintains state for the content window, such as size, position, visibility of frame elements, and the like. The state may be persisted into a stream when the tabbed browser closes, and then may be read when a new content window is launched. Alternatively, the state may be saved in a registry and read from the registry when the new content window is launched.

The tab window 212 lives on the frame thread. Each tab window 212 is configured to manage communication between the outer frame components (e.g., navigation bar 216, browser frame 214, etc) and an individual tab. The tab window 212 holds pointers to its associated content window 202 and interfaces so that it can manage cross-thread communication between the outer frame components and the individual content window 202. The cross-thread communication may involve cross-thread calls. In one embodiment, calls from the browser frame 214 to the content window 202 may be asynchronous. The tab window 212 is then responsible for marshalling the parameters and posting a message to the main window of content window 202. In contrast, calls from the content window 202 to the frame browser 214 may be synchronous. The tab window 212 is then responsible for marshalling the interfaces of the corresponding tab window 212. The tab window 212 may also convert synchronous calls into asynchronous calls in order to reduce the likeliness that a tab will hang.

The tab window 212 may also cache a limited amount of state. This allows the tab window to provide a quick synchronous lookup of state to other components. When the tab window 212 receives an event from the content window 202 that modifies the state, the tab window propagates these events up to the tab window manager 220.

In addition, the tab window 212 exposes several operations that can be performed on a tab, such as destroy, set visibility, set size, set position, and order. The tab window 212 also exposes operations that the frame needs for asynchronously invoking a tab. These operations may be exposed via individual application programming interfaces (API) or through a generic API.

The tab window manager 220 hosts multiple content windows 202 via multiple tab windows 212. The tab window manager 220 manages the overall state of each of the tabs. The state may include: a top level URL; a page title; a back/forward button availability; a favorite icon for the current page, a progress state for the current page, security information reflected in the user-interface (e.g., HTTPs info); and the like. The tab window manager 220 may synchronously query the tab window 212 for per-tab data. In addition, the tab window manager 220 manages the operations performed on the tabs, such as open, close, select, move, set size, set position, set order, and the like. This is achieved by accessing the operations exposed via the tab window 212.

The browser frame 214 hosts the navigation bar 216, frame command bar 218, tab window manager 220, and the tab UI 222. The browser frame 214 may also directly or indirectly host a rebar control (not shown). The browser frame 214 brokers communication between these hosted components.

Figure 3:
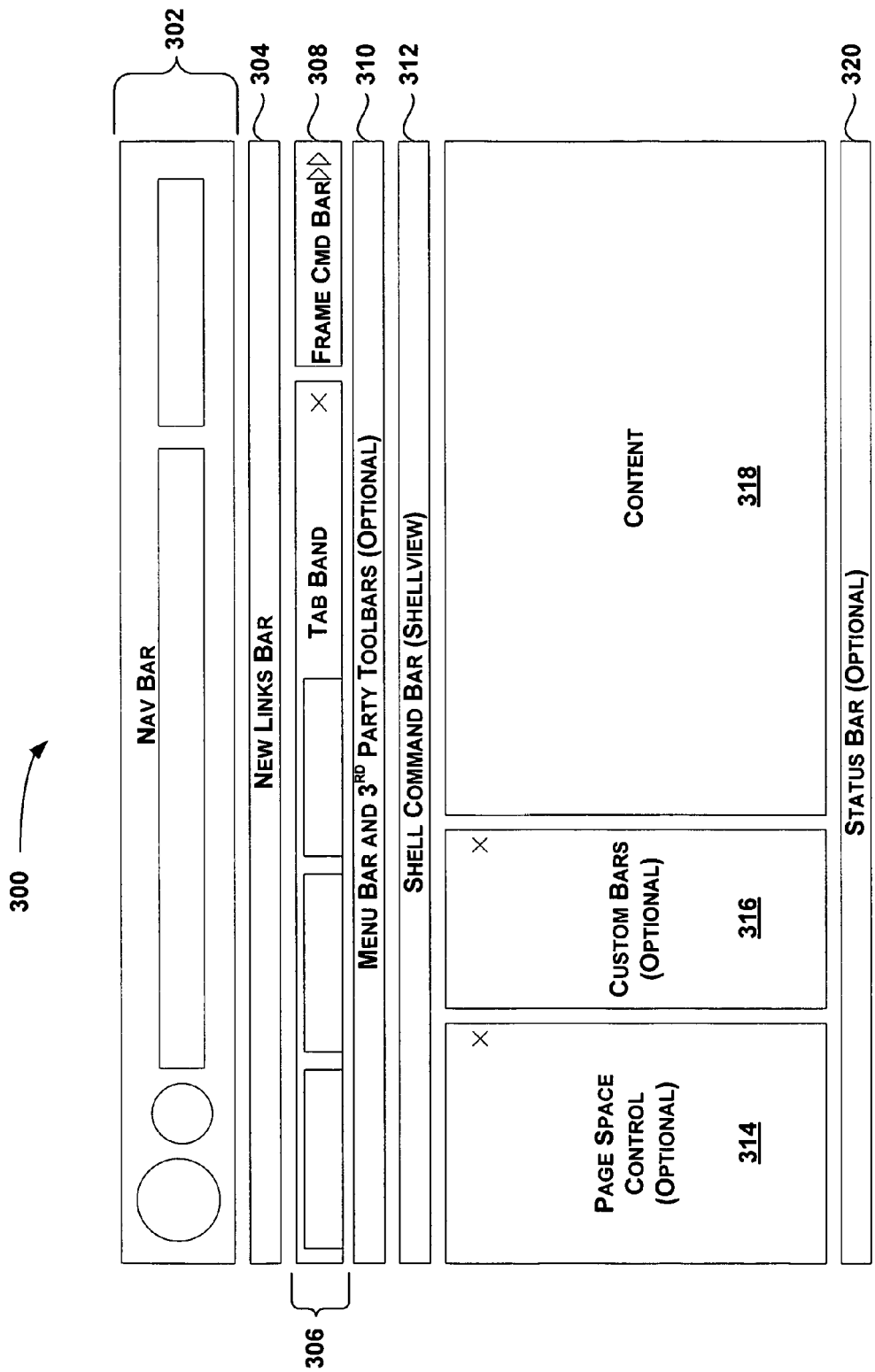
FIG. 3 is one embodiment of a display illustrating a user-interface for browsing the tabbed-heterogeneous windows that are managed by the architecture illustrated in FIG. 2.
Figure 4:
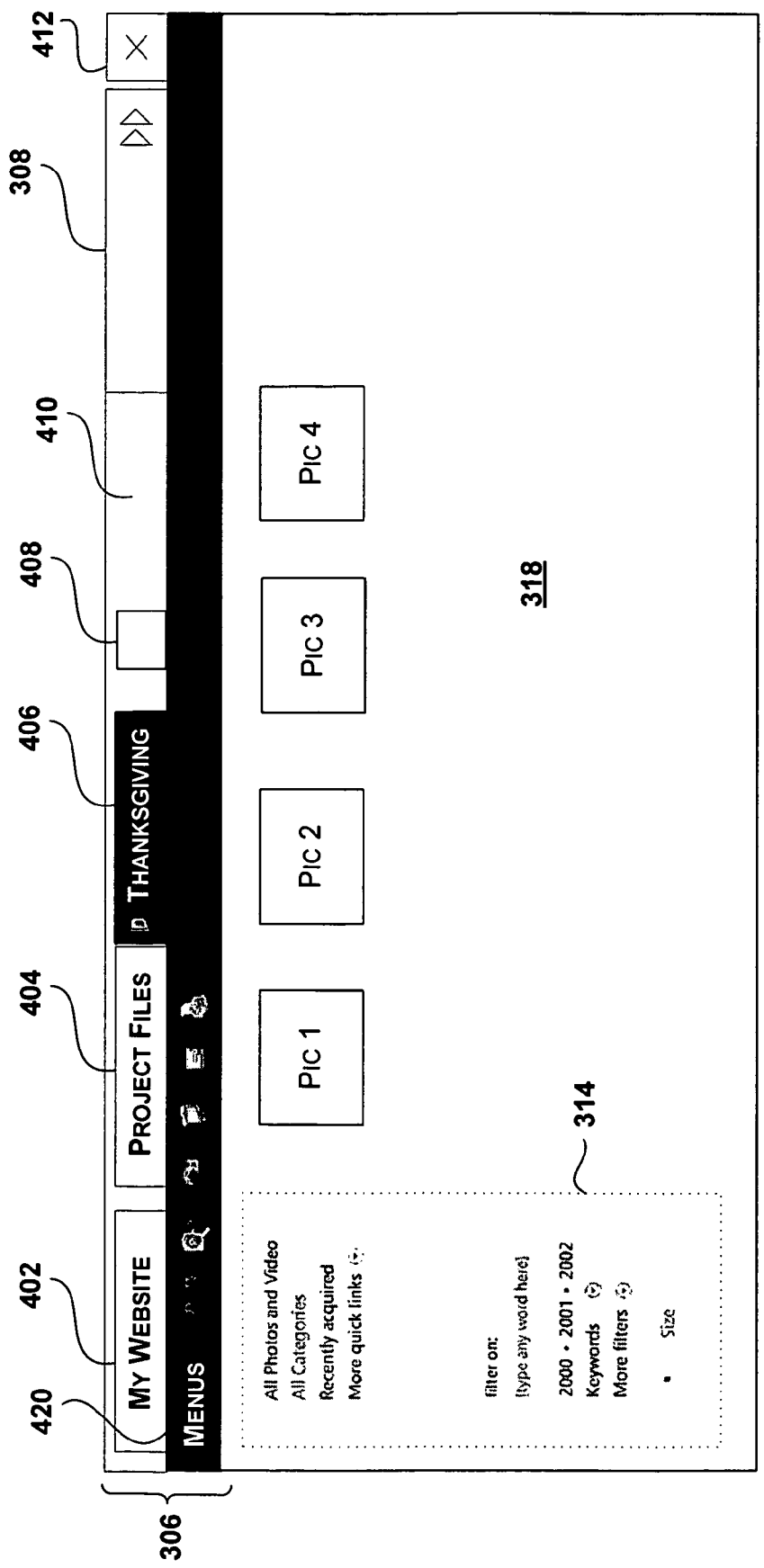
FIG. 4 is one embodiment of a display illustrating a selection of a tab from the user-interface illustrated in FIG. 3.
Figure 5:
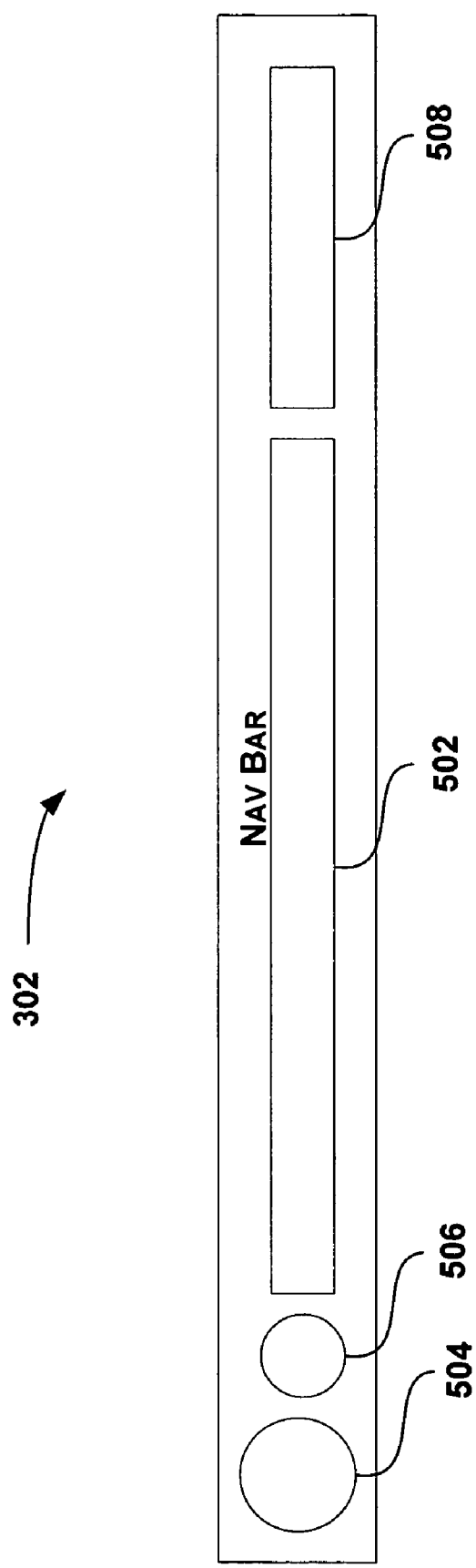
FIG. 5 is one embodiment of a display illustrating the navigation bar shown in FIG. 3.

The tab UI 222 is configured to render the user-interface for the collection of tabs. FIGS. 3-5, discussed below, illustrate one embodiment for the user-interface. In addition, the tab UI 222 controls the rectangle for the tabs' browser region. Tab UI 222 receives events from tab window manager 220 via browser frame 214. The events pertain to the tabs being managed by tab window manager 220. The events include an "OnTabListChanged" event, an "OnTabChanged" event, and the like. The "OnTabListChanged" event is sent by tab window manager 220 when changes are made to a collection of tabs (e.g., Open, Close, Reorder, etc). The "OnTabChanged" event is sent by tab window manager 220 when a single tab changes (e.g., progress, title, URL). The corresponding tab window 212 sends a notification to tab window manager 220 which forwards the notification to tab UI 222. The notification identifies the tab. This method of communication keeps the communication serialized. In an alternate embodiment, individual tab windows 212 may directly call into tab UI 222. In addition, there may be multiple tab UI 222 components, each one handling the same set of tabs, but for a different location on the user-interface. For example, one tab UI may handle a tab row along the top of the display and another tab UI may handle a tab listview along the side of the display.

The frame command bar 218 provides a set of commands that have been determined to be the most useful to the tabs. By having this set of commands readily available for any tab, a user can conveniently locate one of the commands for any tab.

Exemplary User-Interface

FIG. 3 is one embodiment of a display illustrating a user-interface 300 for browsing the tabbed-heterogeneous windows that are managed by the architecture illustrated in FIG. 2. The user-interface 300 includes a navigation bar 302, a new links bar 304, a tab band 306, a frame command bar 308 and content 318. The user-interface 300 may optionally provide a third party toolbar 310, a shell command bar 312, a page space control 314, a status bar 320 and/or custom bars 316.

In one embodiment, items in the user-interface 300 that are per frame include the navigation bar 302, the tab band 306, the frame command bar 308, and the links bar 304. Items in the user-interface 300 that are per tab include menu bar and third party toolbars 310 (e.g., MSN toolbar), the page space control 314, custom bars 316, content 318, and status bar 320. The optional components are well known and need not be discussed in further detail.

Interestingly, content 318 includes different type of data sources. For example, content 318 may be a web page, a shell folder, a navigation based application, and the like. This heterogeneous content may be hosted in a single frame. Of particular interest to the present tabbed browser is the tab band 306, the frame command bar 308, and the operation of the navigation bar 302. Each of these items is discussed in more detail in conjunction with FIGS. 4-5.

FIG. 4 illustrates a tab band 306 illustrated in FIG. 3 where the selected tab is associated with a shell folder. In particular, content 318 is a picture directory having several picture files PIC 1-4. In this example, tab band 306 includes three tabs (i.e., tab 402, tab 404, and tab 406). Each tab 402-406 may include a title and an icon that associated with the particular content 318. Tab band 306 illustrates tab 406 as the selected tab (hereinafter, referred to as selected tab 406). The tab band 306 may also display a menu 420 associated with the selected tab 406. The menu 420 includes commands specific to the content 318. These commands allow the content 318 to have the full functionality available to it as if the content 318 was not hosted within a tab. In the example show in FIG. 4, the commands includes a print command, an email command, a magnify command, and the like. Tab band 306 also includes a create button 408 for creating a new tab and a close button 412 for closing tabs. There are also several hot keys that are recognized by the user-interface. In the example display, a page space control 314 is shown to the left of the content 318. The page space control 314 operates as if within a traditional browser. The tab band 306 obtains focus by clicking on an empty area 410 in the tab band.

In another embodiment, the selected tab 906 may have a theme blended into the tab when the tab becomes active. For example, certain content (e.g., shell folders) may have a theme associated with it. This theme may then be blended into the associated tab in order to help identify the tab.

In another embodiment, the tab band 306 may include a drag file icon (not shown). A user can drop the drag file icon onto a tab to switch tabs.

The frame command bar 308 appears when viewing a web page. By default, the frame command bar 308 may be hosted on same row as the tabs and may show the top N commands.

FIG. 5 is the navigation bar 302 illustrated in FIG. 3. The navigation bar 302 may include an address bar 502, a back button 504, a forward button 506, and a search box 508. The content of the address bar 502 is maintained for each tab. Thus, when "clicking" through the tabs, the address bar 502 displays the address for the currently selected tab. When the tab row is in focus, the back button 504 changes the selected tab to be the tab to the left of the currently selected tab in the tab row. The forward button 506 changes the selected tab to be the next tab in the tab row moving to the left. The search box 508 allows text to be entered and searched for in the currently selected tab.

Exemplary Operation

Figure 6:
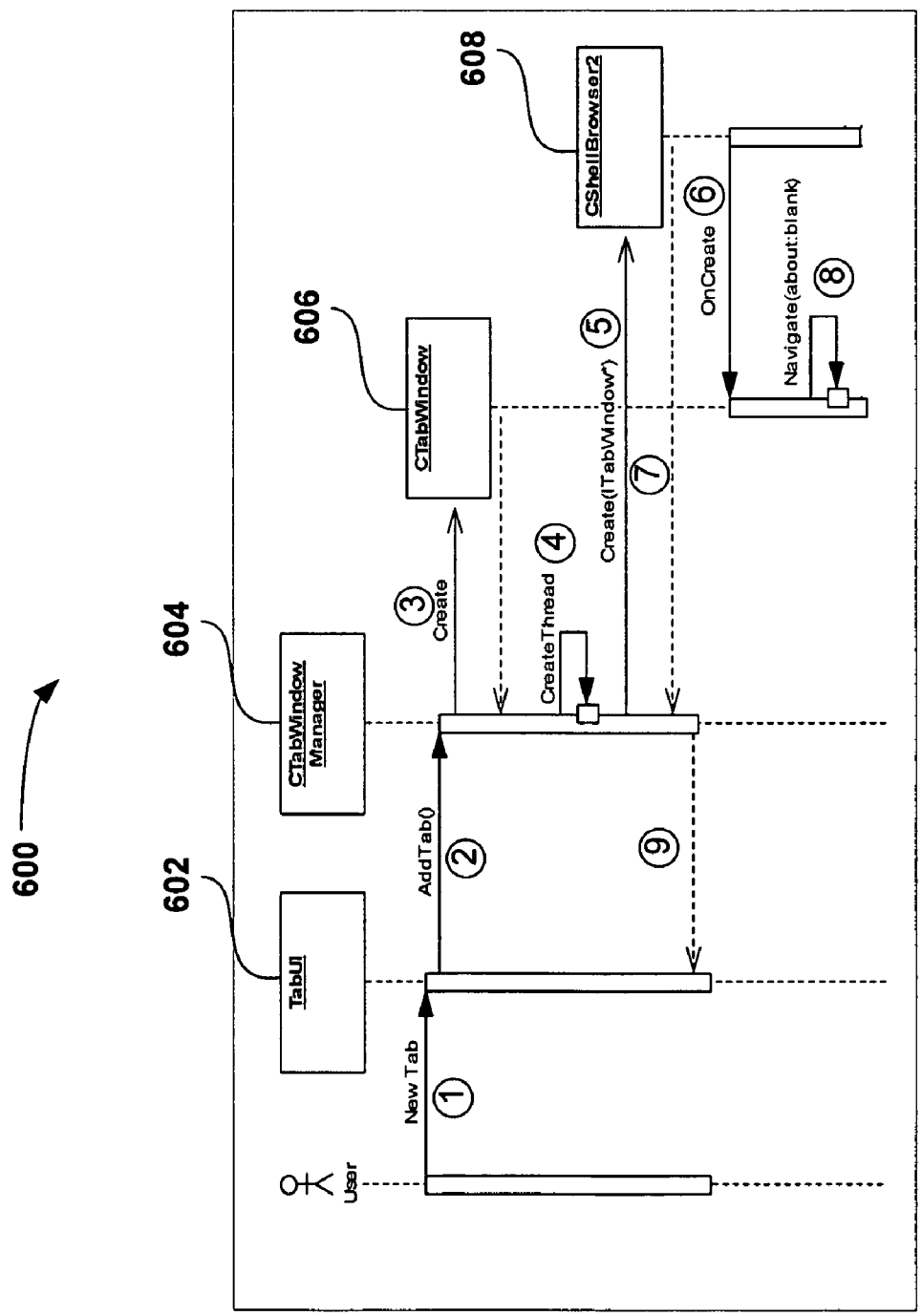
FIG. 6 is a flow diagram that illustrates a process for adding a tab implemented with the architecture shown in FIG. 2.

FIG. 6 is a flow diagram that illustrates a process for adding a tab implemented with the architecture shown in FIG. 2. TabUI 602 represents the user-interface as seen by a user. CTabWindowManager 604 represents a class that performs the functionality provided by the tab window manager 220 shown in FIG. 2. CTabWindow 606 represents a class that performs the functionality provided by one of the tab windows 212 shown in FIG. 2. CShellBrowser2 608 represents a class that performs the functionality provided by on of the content windows 202 shown in FIG. 2.

The process 600 for adding a tab begins at step 1. At step 1, an "add tab" action is relayed to the TabUI 602. The "add tab" action may include a user selecting the create tab button on the user-interface, entering a hot-key, or the like.

At step 2, after the TabUI 602 has been notified of the "add tab" action, TabUI 602 invokes a method (e.g., CTabWindowManger::Add( )) on CTabWindowManager 604.

At step 3, the CTabWindowManager 604 creates a new tab to its collection via CTabWindow 606.

At step 4, the CTabWindowManager 604 creates a new thread. A marshaled pointer to the new ITabWindow is passed as an argument inside a creation data structure (e.g., IETH-READPARAM).

At step 5, the thread process creates an instance of CShellBrowser 608 using a handle (HWND) from the ITabWindow as the parent.

At step 6, the thread process passes the creation data structure into CreateWindow and hooks up event sinks.

At step 7, the CShellBrowser 608 performs per-tab initialization logic and fires an event back to CTabWindowManager 604.

At step 8, the CShellBrowser 608 is available for navigation. A process for navigating using tabs is illustrated in FIG. 7 and described below.

The above logic allows the tab to appear immediately which gives the user fast feedback. The actual call to CTabWindowManager 604 is asynchronous which prevents the user-interface from hanging. The CTabWindow 604 may paint a white background until the CShellBrowser 608 has been created and is ready for navigation. In one embodiment, adding a tab will open a tab to the right of the rightmost tab on the tab row.

Figure 7:
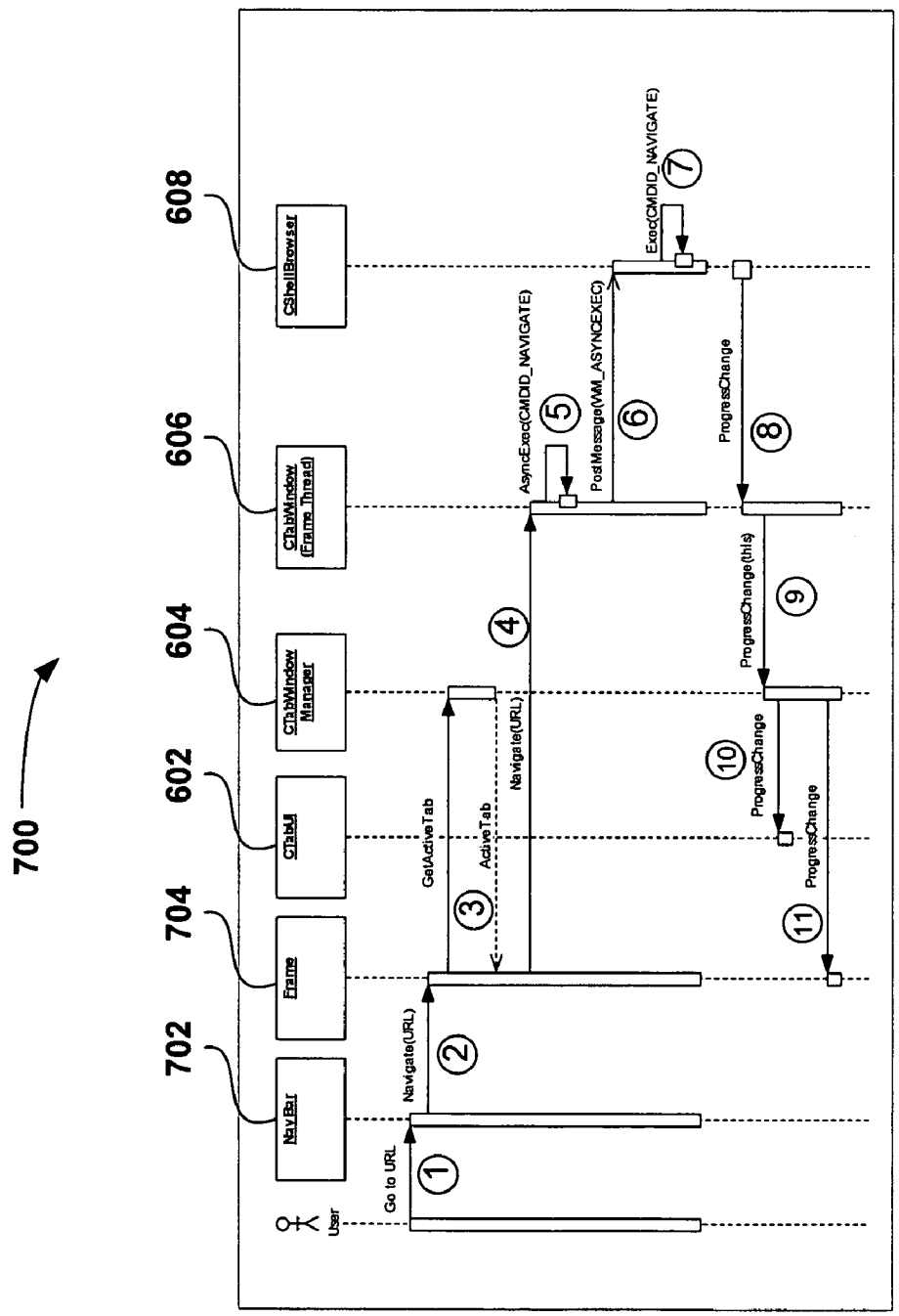
FIG. 7 is a flow diagram that illustrates a process for navigating with tabs implemented with the architecture shown in FIG. 2.

FIG. 7 is a flow diagram that illustrates a process for navigating with tabs implemented with the architecture shown in FIG. 2. TabUI 602 represents the user-interface as seen by a user. CTabWindowManager 604 represents a class that performs the functionality provided by the tab window manager 220 shown in FIG. 2. CTabWindow 606 represents a class that performs the functionality provided by one of the tab windows 212 shown in FIG. 2. CShellBrowser2 608 represents a class that performs the functionality provided by on of the content windows 202 shown in FIG. 2. NavBar 702 represents a class that performs the functionality provided by the navigation bar 216 shown in FIG. 2. Frame 704 represents a class that performs the functionality provided by the browser frame 214 shown in FIG. 2.

At step 1, a user enters an URL into the address bar on the user-interface and clicks Go.

At step 2, the navigation bar 702 calls a navigation method on the frame browser 704. The URL and any other necessary parameters are passed into the navigation method.

At step 3, the frame browser 704 receives an active tab from the CTabWindowManager 604.

At step 4, the frame browser 704 calls the navigate method on the active tab and passes the URL.

At step 5, the CTabWindow 606 packages the URL and other parameters and calls a method for navigation.

At step 6, the method performs a cross-thread PostMessage into the CShellBrowser 608. By using the PostMessage, instead of a direct method call, the architecture reduces the likelihood that the tab will hang. In one embodiment, a IDispatch-style wrapper may be used.

At step 7, the CShellBrowser 608 processes the message and invokes the CShellBrowser's IOleCommandTarget:: Exec method with the command ID and arguments.

At step 8, during navigation, events (e.g., ProgressChange) are fired back synchronously from CShellBrowser 608 to the CTabWindow 606 via a marshaled interface pointer.

At step 9, CTabWindow 606 forwards the call to CTabWindowManger 604 along with information identifying which tab was the source of the event.

At step 10, CTabWindowManager 604 updates the CTabUI 602 based on the event and forwards the event to the frame 704 if the event occurred on the active tab, step 11.

Exemplary Hierarchy for Components of Architecture

Figure 8:
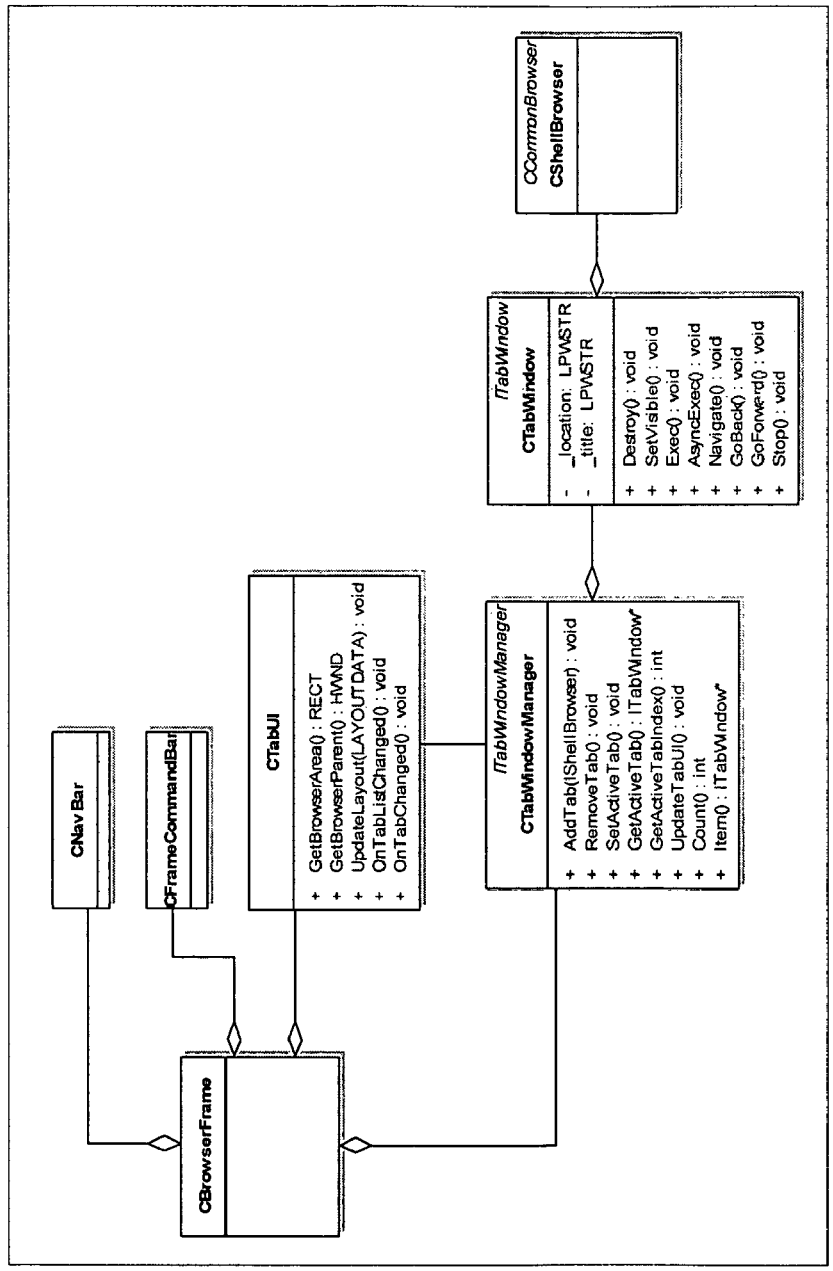
FIG. 8 is one embodiment of a hierarchy for the components of the architecture shown in FIG. 2 and corresponding functionality of each component.

FIG. 8 is one embodiment of a hierarchy 800 for the components of the architecture shown in FIG. 2 and their corresponding functionality. As mentioned above, the CBrowserFrame hosts the CNavBar, the CFrameCommandBar, the CTabUI, and the CTabWindowManager. The CTabWindowManager exposes a random access collection of CTabWindow objects and manages the overall state of the tabs. The CTabWindow implements a tab. The CShellBrowser that is shown, not only hosts web content, but is also capable of hosting non-web content, such as a shell view, word processing document, a spreadsheet document, a document view, or the like. In addition, CTabWindow can host arbitrary windows (HWNDs).

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the present mechanism may be practiced without one or more of the specific details, or with other methods, resources, materials, etc. In other instances, well known structures, resources, or operations have not been shown or described in detail merely to avoid obscuring aspects of the present consistent visual appearance technique.

While example embodiments and applications have been illustrated and described, it is to be understood that the present technique is not limited to the precise configuration and resources described above. Various modifications, changes, and variations apparent to those skilled in the art may be made in the arrangement, operation, and details of technique disclosed herein without departing from the scope of the claimed invention.

What is claimed is:

1. A computer-implemented method for managing multiple content windows, the method comprising:
    grouping a set of content windows into a window frame of a tabbed browser application in a manner such that a taskbar shows one item for the set of content windows, each of the content windows displaying heterogeneous content, the heterogeneous content of at least one of the content windows being a web page and the heterogeneous content of at least one other of the content windows not being a web page;
    associating a tab with each of the content windows;
    processing each tab using a separate thread, such that if one tab hangs other tabs will not hang;
    associating a content specific menu with each tab, the content specific menu including commands based on the heterogeneous content associated with a given tab, the commands providing functionality to the heterogeneous content; and
    displaying an address bar in the window frame, the address bar displaying an address of a currently selected tab.

2. The computer-implemented method of claim 1, wherein the heterogeneous content of the other content window includes a directory.

3. The computer-implemented method of claim 1, wherein the heterogeneous content of the other content window includes a document.

4. The computer-implemented method of claim 1, wherein the heterogeneous content of the other content window includes a shell folder.

5. The computer-implemented method of claim 1, further comprising adding another content window to the set of content windows and associating a new tab with the another content window.

6. The computer-implemented method of claim 5, wherein the heterogeneous content for the another content window downloads in the background.

7. The computer-implemented method of claim 6, wherein a current content window selected from the set of content windows remains in focus during the downloading.

8. The computer-implemented method of claim 1, further comprising applying a theme to at least one of the tabs.

9. One or more computer-readable storage media having computer-executable instructions for performing a method comprising:
    displaying a user-interface of a tabbed browser application, the user-interface including a window frame, a navigation bar, and a tab band, the tab band to accommodate a plurality of tabs each having a heterogeneous content window, the window frame to accommodate the plurality of tabs and their respective heterogeneous content windows;
    displaying a tab within the tab band;
    processing each tab by a separate thread, such that if one tab hangs other tabs will not hang;
    prioritizing an individual thread associated with an active tab, such that the active tab is prioritized over a background tab;
    downloading heterogeneous content in a heterogeneous content window associated with the tab;
    bringing the tab into focus;
    displaying a content specific menu for the selected tab, the content specific menu providing commands specific to the heterogeneous content in the content window associated with the selected tab, the commands proving functionality for the heterogeneous content; and
    changing the tab in focus in response to selection of a forward or back button of the navigation bar.

10. The computer-readable storage media of claim 9, further comprising applying a theme to the tab.

11. The computer-readable storage media of claim 9, further comprising displaying an address bar in the window frame, the address bar displaying an address of the tab in focus.

12. The computer-implemented method of claim 1, the window frame comprising a navigation bar having a forward button and a back button, the method further comprising changing the currently selected tab in response to selection of the forward button or the back button.

13. A computer-implemented method comprising:
    displaying a tabbed browser window of a tabbed browser application including a first tabbed window and a second tabbed window, wherein the first tabbed window includes a web page and the second tabbed window includes content other than a web page, and wherein each tabbed window is processed by a separate thread, such that if one tab hangs other tabs will not hang;
    displaying an address bar in the tabbed browser window, the address bar displaying an address of a currently selected tab.

14. The computer-implemented method of claim 13, further comprising:
    displaying a navigation bar in the tabbed browser window, the navigation bar having a forward button and a back button; and
    changing the currently selected tab in response to selection of the forward button or the back button.

15. The computer-implemented method of claim 14, wherein the second tabbed window includes a directory, a document, or a shell folder.

16. The computer-implemented method of claim 13, further comprising adding another tabbed window to the tabbed browser window.

17. The computer-implemented method of claim 13, further comprising displaying a content specific menu associated with the currently selected tabbed window, the content specific menu including commands based on content of the currently selected tab.

18. The computer-implemented method of claim 13, further comprising applying a theme to at least one of the tabs.

19. The computer-implemented method of claim 1, further comprising prioritizing an individual thread corresponding to an active tab, such that the active tab is prioritized over a background tab.

* * * * *